United States Patent Office 3,806,499
Patented Apr. 23, 1974

3,806,499
PROCESS FOR POLYMERIZING ETHYLENE
Corrado Mancini, and Raffaele Gaspari, Milan, Italy, assignors to Societa Italiana Resine, S.p.A., Milan, Italy
No Drawing. Filed Dec. 13, 1971, Ser. No. 207,656
Claims priority, application Italy, Dec. 23, 1970,
33,462/70
Int. Cl. C08f 1/60, 3/04
U.S. Cl. 260—94.9 R    5 Claims

ABSTRACT OF THE DISCLOSURE

Ethylene polymer products are obtained which can be transformed into films with high optical properties and high mechanical properties, particularly with regard to impact strength, by a process which consists essentially in carrying out, in a single tubular reactor and in succession:

at least one reaction of polymerization of ethylene, forming substantially linear polymers, with the presence of measured quantities of long branched polymers;
at least one reaction of polymerization of ethylene with the formation of substantially branched polymers with short branchings;
at least one treatment to homogenize the various macromolecular types present.

---

The present invention relates to a process for the polymerization of ethylene at elevated pressures by using tubular reactors, in other words reactors with a high proportion of length to diameter. It is known that such processes are carried out at elevated pressures of approximately 1,000 kg./sq. cm. and at temperatures of 100 to 320° C., the ethylene being supplied continuously to one end of the tubular reactor.

Polymerization also takes place in the presence of initiators consisting of substances which generate free radicals under the conditions of working.

Normally used as initiators are organic peroxides which are supplied to the polymerization reactor dissolved in organic solvents.

The ethylene polymers which are obtained in this way are widely used in industry after being converted to film.

The properties of the manufactured goods which are obtained from substances of a polymeric nature obviously depend upon the characteristic features of the polymer which is subjected to processing, these characteristic features in turn depending upon the conditions under which polymerization was performed.

For example, polyethylene films have good mechanical properties, particularly a high impact strength, when made from polymers obtained by polymerization of the monomer at relatively low pressures, such as for example at pressures below approximately 2,000 kg./sq. cm., while in order to obtain products having good optical characteristics, it is necessary to carry out polymerization in a higher range of pressures.

It is possible to obtain products having only intermediate characteristics by working at a pressure between those at which polymers of desirable optical characteristics are obtained and those at which polymers are produced which can be transformed to films with high mechanical properties.

Finally, decidedly negative results are obtained by homogenizing ethylene polymers obtained by polymerization at different pressures, even when homogenization is carried out by melting of the said polymers or by dissolution in a solvent.

In conclusion, from what is known in the art, it is not possible to produce ethylene polymers which can be converted to film which have both high optical and mechanical properties, and this is undoubtedly a drawback.

It has now been found possible to overcome the disadvantages described and produce ethylene polymers which have a range of characteristic features which cannot be obtained at one and the same time by the processes of polymerization of ethylene which are known in the prior art.

In particular, according to the present invention, ethylene polymer products are obtained which can be transformed into films with high optical properties and high mechanical properties, particularly with regard to impact strength, by a process which consists essentially in carrying out, in a single tubular reactor and in succession:

at least one reaction of polymerization of ethylene, forming substantially linear polymers, with the presence of measured quantities of long branched polymers;
at least one reaction of polymerization of ethylene with the formation of substantially branched polymers with short branchings;
at least one reaction of polymerization of ethylene with the formation of substantially branched polymers with short branchings;
at least one treatment to homogenize the various macromolecular types present.

According to the process of the present invention, the reaction to form substantially linear polymers is achieved by the action of a single polymerization initiator which is chosen from those having a homolytic decomposition temperature below 120° C. for half life of one minute, the ethylene being polymerized in the presence of at least one substance having marked chain transference characteristics.

In this way, the formation of substantially linear polymers is induced, with the presence of measured quantities of long chain polymers, by the intermolecular chain transfer effect. In particular, the ethylene polymerization initiator and the substances with marked chain transfer characteristics are supplied in a single stream or a plurality of streams to the zone of the tubular reactor at the end of which the ethylene is supplied.

Also according to the process of the present invention, the formation of substantially branched polymers is obtained by the action of a mixture of three or more initiators comprising at least one initiator chosen from among those having a homolytic decomposition temperature of less than 120° C. for a half life of one minute, and at least one initiator chosen from among those having a homolytic decomposition temperature in excess of 120° C. for a half life of one minute, and by polymerizing the ethylene in the presence of at least one substance having weak chain transference characteristics.

In this way, the formation of substntially branched polymers is achieved, with short branchings by the intermolecular change transference effect.

In particular, the mixture of initiators and the substances having weak chain transference characteristics are supplied in a single stream or a plurality of streams into the intermediate zone of the tubular polymerization reactor.

In carrying out the objects of the present invention, the initiator with a homolytic decomposition temperature below 120° C. is preferably supplied in quantities equal to or less than 50 mols to every $10^6$ mols ethylene, and the substances with marked chain transference characteristics are preferably supplied in quantities equal to or less than 5,000 mols to every $10^6$ mols of ethylene supplied to the end of the tubular reactor.

The objects of the present invention are also best implemented when, in the mixture of initiators, a molar ratio among the initiators with a homolytic decomposition temperature above 120° C. and those with a decomposition temperature below 120° C. is kept within the range from 0.2:1 to 20:1, such initiators being supplied preferably in a total quantity equal to or less than 100 mols to every $10^6$ mols of ethylene.

In addition, the substances having weak chain transference characteristics are preferably supplied to the polymerization reactor in quantities equal to or less than 10,000 mols to every $10^6$ mols of ethylene, reference still being made to the ethylene supplied to the end of the tubular reactor.

According to the process of the present invention, the flow of the individual initiator (or the first flow of the single initiator) is preferably supplied into the zone, at the end of which the ethylene is supplied, at a point in the reactor where the temperature assumes levels equal to or higher than 110° C.

In the process of the present invention, it is essential to maintain between the point of introduction of the single initiator (or the first point of introduction of the single initiator) and the point at which the mixture of initiators (or the first point of introduction of the mixture of initiators) is introduced, a fall in pressure equal to at least 200 kg./sq. cm. and a temperature differential equal to at least 50° C.

According to the process of the present invention, provision is made for a treatment to homogenise, inside the polymerization reactor, the macromolecular types produced.

For this purpose, in the zone of the reactor at the end of which the products of reaction are discharged, one or a plurality of substances having a solvent effect on the ethylene polymers is or are supplied at at least one point preferably in quantities equal to or greater than 0.1% by weight with respect to the ethylene supplied at the end of the reactor. In this way, homogenization of the various macromolecular types produced is achieved at molecular level when, between the point of introduction of the mixture of initiators (or the first stream of the mixture of initiators) and the point of introduction of the solvent (or the first stream of solvent), a fall in pressure equal to at least 150 kg./sq. cm. is maintained.

It is also essential to have a rise in temperature of at least 50° C. between the aforesaid points.

In any case, it is understood that the levels which may be assumed by the pressure will be comprised within the range from 500 to 5,000 kg./sq. cm. while the temperature will be between 100 and 320° C.

The ethylene polymers obtained according to the process of the present invention have a range of characteristic features which renders them particularly suitable for the production of films having both high mechanical and high optical characteristics.

Typically by means of the process described, ethylene polymers are obtained which have a melt index value equal to 2.0 gr./10 minutes, with a nominal density at 23° C. equal to 0.920 gr./cu. cm. Such polymers, extruded under the following conditions:

| | |
|---|---|
| Compression ratio I zone | 2.56 |
| Compression ratio II zone | 2.18 |
| Screw D | 45/25 |
| Temperature from the hopper | (¹) |
| Gel line mm | 200 |
| Swelling ratio | 2 |

¹ 130°, 130°, 135°, 140°, 150°, 160° C.

produce films to a thickness of 0.03 mm., having the following characteristic features:

| | |
|---|---|
| Haze clouding | Equal to or less than 6% (ASTM—D 1003). |
| Surface brightness (gloss) | Equal to or greater than 65% (ASTM—D 523). |
| S.T.S. | Equal to or greater than 90%. |
| N.O. | Equal to or greater than 90%. |
| B.D. (ball drop) | Equal to or greater than 160 gr. (ASTM—D 1709). |

The S.T.S. property (see-through) represents the complement to 100 of the measurement obtained with the "Film Transparancy Meter" made by Evans Electroselenium. In this respect, reference is made to the article: "See-Through Clarity of Polythene" by J. A. C. Miles and A. E. Thornton, British Plastics, pp. 26–31, January 1962.

The term N.O. is used to denote the optical number of the polyethylene film. In order to be able to express an overall evaluation of the optical qualities of the film, in addition to reasons of classification, a formula has been worked out comprising the three conventional optical measurements (haze, gloss and experimental see through). These measurements are considered as three components to which equal weight is given in any overall optical assessment, and therefore they are reduced to the same scale.

Thus, the resultant optical number is represented by the following formula:

$$NO = (aHz^{-b} + a_1 G^{-b_1} + S.T.S.)/3$$

in which:

Hz = haze
G = percentage gloss at 45°
S.T.S. = experimental see-through
$a, a_1, b, b_1$ = constants obtained by the methods of minimum squares using the experimental values for haze, gloss and experimental see-through measured over a very great number of commercial products.

The values of these constants are calculated thus: $a = 223.3$; $b = 0.526$; $a_1 = 7.141$; $b_1 = 0.603$.

It is felt that the particular properties of ethylene polymers and the characteristic features of the articles manufactured with them depend upon the particular structure of the polymers obtained by the process of the present invention.

In fact, by using the process described, it is believed possible to control not only the average molecular weight and the distribution of the molecular weight of the polymer as in the previously known processes, but also the various lengths of polymeric chain.

In reality, according to the process of the present invention, there are two distinct polymerization reactions which result in polymers of essentially linear structure with measured quantities of long branchings and polymers of a substantially branched structure, with short branchings.

A surprising fact is that from products with such a different structure it is possible to obtain ethylene polymers which have the high characteristic features described since, from what is known in the art, homogenization of the polymers obtained under different conditions of pressure, and therefore of different structure, do not produce desirable results.

It is considered that the particularly good results obtained by the use of the process according to the present invention are to be attributed not only to the structure of the polymers but also to the particular homogenization of the macromolecular types, within the same polymerization reactor, under conditions which have been previously defined.

As already stated, it is felt that under such conditions homogenization at molecular level is achieved.

A further advantage of the process described resides in the flexibility, in that it is possible to obtain ethylene polymers having variable characteristics in a wide range of values, for example variation of one or more conditions in the reaction resulting in the formation of substantially linear polymers and/or in the reaction resulting in the formation of substantially branched polymers.

According to the process of the present invention, ethylene is for example polymerized in tubular reactors in which the inside diameter may range from 25 to 40 mm., and the length may be equal to or greater than 500 metres, being preferably from 500 to 1,200 metres.

In addition, the reaction to polymerized ethylene which results in substantially linear polymers takes place by the action of initiators comprising organic peroxides or azocompounds chosen from among those having a homolytic decomposition temperature below 120° C. for a half life of one minute. Particularly useful for the purpose are: 2,4-dichlorobenzoylperoxide, propionylperoxide, caproylperoxide, caprylylperoxide, pelargonylperoxide, isononanoylperoxide, decanoylperoxide, lauroylperoxide, isopropylpercarbonate and tertiarybutylperdicarbonate.

Such initiators are preferably supplied in quantities from 2 to, as noted earlier, 50 mols to every $10^6$ mols ethylene supplied to the end of the tubular reactor.

The reaction leading to the formation of substantially linear polymers also takes place in the presence of substances having marked chain transference characteristics, such as for example toluene, the xylenes or mixtures of these.

Such substances are preferably supplied in quantities of 50 to, as noted earlier 5,000 mols to every $10^6$ mols ethylene supplied to the end of the tubular reactor.

In practice, polymerization initiators are supplied dissolved in chain transferors in one or more streams to the zone of the reactor at the end of which the ethylene is supplied.

The ethylene polymerization reaction which leads to substantially branched polymers occurs by the action of mixtures of initiators, of which at least one has a homolytic decomposition temperature higher than 120° C. for a half life of one minute, belonging to the organic peroxides class.

Found to be particularly useful among these initiators are benzoylperoxide, tertiarybutylperbenzoate, tertiarybutylperacetate, tertiarybutylperisooctate, dicumylperoxide, methylethylketoneperoxide, cyclohexanoneperoxide, cumenehydroperoxide, ditertiarybutylperoxide, and p-menthanehydroperoxide.

The initiators in mixture are preferably supplied in a total quantity of 10 to, as noted earlier, 100 mols to every $10^6$ mols of ethylene supplied to the end of the tubular reactor.

The reaction resulting in the formation of substantially branched polymers also takes place in the presence of substances having weak chain transference characteristics.

For this purpose, it is possible to use one or more saturated aliphatic hydrocarbons such as pentane, hexane and heptane or more preferably mixtures of saturated aliphatic hydrocarbons and aromatic hydrocarbons.

Such substances are preferably supplied in quantities of 100 to, as noted earlier, 10,000 mols to every $10^6$ mols of ethylene supplied to the end of the tubular reactor.

In practice, polymerization initiators in mixture are supplied dissolved in the substances or mixtures of substances which have weak chain transference characteristics, and at one or more points in the intermediate zone of the tubular reactor.

The treatment to homogenize the macromolecular types produced occurs by supplying to the reactor substances having a solvent action on the ethylene polymer, for example aromatic hydrocarbons such as toluene, xylene or mixtures thereof.

Such solvent substances are preferably supplied in quantities of from, as noted earlier, 0.1% to 5% by weight with respect to the ethylene supplied to the end of the tubular reactor, in the zone of the reactor in which the products of reaction are discharged.

It should be noted that such solvent substances cannot be introduced upstream of the reactor in the quantities indicated in that they would not allow ethylene polymers to be obtained to the degree of polymerization required, by virtue of the excessively high chain transfer effect.

In the process according to the present invention, it is appropriate to control the temperature by streams at different temperature passing through the outer jacket of the reactor corresponding to the zones in which the reactions of polymerization and homogenization of the macromolecular types take place.

More particulary, such fluids can be kept at temperatures from 100 to 250° C. in the initial zone of the reactor where the ethylene is preheated, at a temperature of 100 to 180° C. in the zone in which substantially linear chain polymers are formed, at a temperature of 100 to 160° in the zone in which substantially branched chain polymers are formed and finally at a temperature of 200 to 300° C. in the homogenization zone.

In particular, in this last-mentioned zone, by virtue of the solvent effect of the substance introduced and probably also due to the effect of the turbulence, completely homogeneous ethylene polymers are obtained.

It is considered that this homogenization treatment helps to improve the optical characteristics of the product.

It is well-known that in the processes to produce polyethylene which are carried out at elevated pressures in tubular reactors, the products of reaction are generally discharged in pulsating fashion, mainly in order to facilitate expulsion of the polymer from the reactor, avoiding the depositing of solids.

This technique can be applied to the process according to the present invention, although the conditions of reaction are maintained within those working limits which have been previously stated.

The following experimental examples will serve to illustrate the invention further without however limiting it in any way.

EXAMPLE 1

A tubular reactor with a length of 710 metres and a diameter of approximately 32 mm. is used, ethylene being supplied at one end in quantities equal to approximately 17,000 kg./hr.

The pressure at the end at which the ethylene is supplied is equal to 2,400 kg./cm.

At one point of the reactor, close to the end at which the ethylene is supplied, and in which the temperature of the ethylene is equal to approximately 120° C., a solution of caprylylperoxide in toluene is supplied.

The conditions are so regulated that 32 mols of caprylylperoxide and 4,500 mols of toluene are introduced for every $10^6$ mols of ethylene.

At a point in the intermediate zone of the reactor, where the temperature is equal to 200° C., and the pressure is equal to 2,150 kg./sq. cm., there is supplied a stream consisting of a solution of a mixture of peroxides in pentane with benzene (70:30 by volume). More particularly, caprylylperoxide, decanoylperoxide, tertiarybutyl-perisooctate, tertiarybutylperbenzoate and ditertiarybutylperoxide are used in a molar ratio of 1.5:0.5:1:1:0.5.

The conditions are regulated so that 57 mole peroxides and 5,500 mols solvent to every 10⁶ mols ethylene supplied to the end of the reactor are introduced.

At a point in the reactor, in the part from which the products of reaction are discharged, the temperature assumes levels equal to 260° C. while the pressure assumes levels equal to 1,950 kg./sq. cm., a stream of p-xylene is supplied in quantities equal to 3% by weight with respect to the ethylene supplied at the end of the reactor. Finally, the temperatures are regulated by means of heat exchange media which circulate in an outer jacket of the reactor. In particular, these media are maintained at 190° C. in the ethylene preheating zone, at 160° C. in the zone in which the ethylene is polymerized into substantially linear polymers, at 145° C. in the zone in which it is polymerized to substantially branched polymers and at 210° C. in the homogenization zone.

In addition, the products of reaction are discharged in pulsating fashion.

Under these conditions, the ethylene is converted into polymer in quantities equal to approximately 24%.

The ethylene polymer has a "Melt Index" of 2.1, a nominal density at 23° C. of 0.9189 g./cu. cm. and a mean frequency of short branching, expressed as a number of methyl groups to every 1,000 atoms of carbon, equal to 26.

The ethylene polymer is transformed to films 0.03 mm. thick by extrusion under the conditions previously described. The film has the following specifications:

Haze _____ percent 5.1
Gloss _____ percent 66.0
S.T.S. _____ percent 92.0
N.O. _____ percent 93.0
B.D. _____ gr. 172

EXAMPLE 2

In this example, the same procedure is performed as in Example 1, without however the introduction of organic solvent at the end of the reactor at which the products of reaction are discharged. In this way, an ethylene polymer is obtained which has a Melt Index equal to 2.1 and a nominal density at 23° C. equal to 0.9189 gr./cu. cm. The ethylene polymer is converted to film 0.03 mm. thick by extrusion under the conditions previously described. The film has the following specifications:

Haze _____ percent 7.8
Gloss _____ do 55.0
S.T.S. _____ do 83.0
N.O. _____ do 81.0
B.D. _____ gr 138

EXAMPLE 3

The same conditions are adopted as described in the first example, the only change being in the molar ratio of the mixture of caprylylperoxide to decanoylperoxide to tertiarybutylperiisooctate to tertiarybutylperbenzoate to ditertiarybutylperoxide, which becomes 1.5:0.5:1:1:0.1.

In this way, a peak temperature is obtained in the zone in which polymerization is performed with a mixture of peroxides, the temperature being equal to 290° C. By maintaining the other conditions constant, the ethylene conversion rate is equal to 20% and an ethylene polymer is produced which has a Melt Index of 1.4 and a density of 0.924.

The film, 0.03 mm. thick, obtained in the usual way, has the following specifications:

Haze _____ percent 6.8
Gloss _____ do 62.0
S.T.S. _____ do 83.0
N.O. _____ do 85.0
B.D. _____ gr 90

EXAMPLE 4

The same procedure is adopted as in Example 1, caprylylperoxide being introduced in quantities equal to 80 mols to every 10⁶ mols of ethylene.

In addition, the temperature of the fluid circulating in the preheating zone is raised to 237° C. so that the temperature of the ethylene, at the point where the caprylylperoxide is supplied, is equal to 160° C.

In addition, at this point, the pressure assumes a level equal to 2,200 kg./sq. cm.

By maintaining the other conditions constant, the ethylene conversion rate is equal to 20% and an ethylene polymer is produced which has a melt index of 3.4 and a density of 0.917.

The film, 0.03 mm. thick, obtained in the usual way, has the following specifications:

Haze _____ percent 12
Gloss _____ do 42
S.T.S. _____ do 70
N.O. _____ do 67
B.D. _____ g 156

What we claim is:

1. A process for the polymerization of ethylene in a tubular reactor at pressures from 500 to 5000 kg./sq. cm. and at temperatures of 100 to 320° C., using polymerization initiators, comprising:
   (a) supplying ethylene to one end of the tubular reactor;
   (b) feeding into the tubular reactor at one or more points of a first intermediate zone thereof;
      a single polymerization initiator consisting of an azo compound or a peroxide chosen from among those having homolytic decomposition temperatures below 120° C. for a half-life of one minute, said single polymerization initiator being fed in a quantity of from 2 to 50 mols per 10⁶ mols of said ethylene, and at least one substance chosen from the group consisting of toluene, xylenes and their mixtures, said substance being fed in a quantity of from 50 to 5000 mols per 10⁶ mols of ethylene;
   whereby a first reaction is performed to polymerize ethylene and form substantially linear polymers in which measured quantities of long branchings are present;
   (c) feeding into the tubular reactor at one or more points of a second intermediate zone thereof,
      a mixture of three or more peroxides, at least one of which has a homolytic decomposition temperature below 120° C. for a half-life of one minute, said mixture of peroxides being fed in a quantity of from 10 to 100 mols per 10⁶ mols of said ethylene, and at least one aliphatic hydrocarbon, said aliphatic hydrocarbon being fed in a quantity of from 100 to 10,000 mols per 10⁶ mols of said ethylene;
   whereby a second reaction is performed to polymerize ethylene and form substantially branched polymers with short branchings;
   (d) feeding into the tubular reactor at one or more points near the end thereof from which the products of reaction are discharged an aromatic hydrocarbon having a solvent action on the ethylene polymer, said aromatic hydrocarbon being fed in a quantity of from 0.1 to 5% by weight of said ethylene;
   whereby said polymers formed by said first and second reactions are homogenized; and
   (e) recovering the products of the reaction;
provided that, between the first point of introduction of said single polymerization initiator and the first point of introduction of said mixture of peroxides there is a drop in pressure of at least 200 kg./sq. cm. and a difference in temperature of at least 50° C. and, provided further that, between the first point of introduction of said mixture of initiators and the first point of introduction of said aromatic hydrocarbon there is a drop in pressure of at least 150 kg./sq. cm. and a rise in temperature of at least 50° C.

2. A process according to claim 1, characterized in that in the mixture of initiators a molar ratio is maintained among the initiators with a homolytic decomposition temperature above 120° C., and those with a homolytic decomposition temperature below 120° C., for a half life of one minute, ranging from 0.2:1 to 20:1.

3. A process according to claim 1, characterized in that the aliphatic hydrocarbons are in admixture with aromatic hydrocarbons.

4. A process according to claim 1, characterized in that the aromatic hydrocarbon is chosen from the group consisting of toluene, the xylenes and their mixtures.

5. A process according to claim 1 characterized in that said aliphatic hydrocarbon is selected from the group consisting of pentane, hexane and heptane.

References Cited

UNITED STATES PATENTS

| 3,293,233 | 12/1966 | Erchak, Jr. et al. | 260—94.9 R |
| 3,142,666 | 7/1964 | Deex et al. | 260—94.9 R |

FOREIGN PATENTS

| 1,009,968 | 11/1965 | Great Britain | 260—94.9 P |
| 1,008,115 | 10/1965 | Great Britain | 260—94.9 R |

JOSEPH L. SCHOFER, Primary Examiner
A. HOLLER, Assistant Examiner

U.S. Cl. X.R.

260—94.9 P